United States Patent
Kasher et al.

(10) Patent No.: US 10,432,347 B2
(45) Date of Patent: *Oct. 1, 2019

(54) APPARATUS, SYSTEM AND METHOD OF COMMUNICATING A WIRELESS TRANSMISSION ACCORDING TO A PHYSICAL LAYER SCHEME

(71) Applicant: INTEL IP CORPORATION, Santa Clara, CA (US)

(72) Inventors: Assaf Kasher, Haifa (IL); Carlos Cordeiro, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 15/494,770

(22) Filed: Apr. 24, 2017

(65) Prior Publication Data

US 2017/0317784 A1 Nov. 2, 2017

Related U.S. Application Data

(63) Continuation of application No. 14/749,659, filed on Jun. 25, 2015, now Pat. No. 9,660,760.

(Continued)

(51) Int. Cl.
*H04L 1/00* (2006.01)
*H04L 27/26* (2006.01)
*H04L 29/06* (2006.01)

(52) U.S. Cl.
CPC .......... *H04L 1/0005* (2013.01); *H04L 1/0072* (2013.01); *H04L 1/0075* (2013.01);
(Continued)

(58) Field of Classification Search
CPC ..... H04L 1/005; H04L 1/0072; H04L 1/0075; H04L 27/2613; H04L 27/2627; H04L 69/22
(Continued)

(56) References Cited

U.S. PATENT DOCUMENTS 8,565,325 B1 10/2013 Banerjea
9,660,760 B2 5/2017 Kasher et al.
(Continued)

FOREIGN PATENT DOCUMENTS

WO 2013022468 2/2013

OTHER PUBLICATIONS

Office Action for European Patent Application No. 16747047.5, dated Nov. 23, 2018, 5 pages.
(Continued)

*Primary Examiner* — Ricky Q Ngo
*Assistant Examiner* — Ellen A Kirillova
(74) *Attorney, Agent, or Firm* — Shichrur & Co.

(57) ABSTRACT

Some demonstrative embodiments include apparatuses, devices, systems and methods of communicating a wireless transmission according to a Physical Layer scheme. For example, a wireless station may be configured to generate a frame including a header and a data portion, the header including a modulation and coding scheme (MCS) value of an Orthogonal Frequency Divisional Multiplexing (OFDM) Physical layer (PHY) scheme or a Low Power Single Carrier (LPSC) PHY scheme; modulate and encode the header according to a Single Carrier (SC) PHY scheme; modulate and encode the data portion according to the OFDM PHY scheme or the LPSC PHY scheme; and process transmission of the frame.

25 Claims, 5 Drawing Sheets

Related U.S. Application Data

(60) Provisional application No. 62/110,687, filed on Feb. 2, 2015.

(52) U.S. Cl.
CPC ........ *H04L 1/0079* (2013.01); *H04L 27/2613* (2013.01); *H04L 27/2627* (2013.01); *H04L 69/22* (2013.01)

(58) Field of Classification Search
USPC .......................................................... 370/329
See application file for complete search history.

(56) References Cited

U.S. PATENT DOCUMENTS

| | | |
|---|---|---|
| 2003/0012302 A1 | 1/2003 | Webster et al. |
| 2007/0248179 A1 | 10/2007 | Hassan et al. |
| 2010/0080266 A1* | 4/2010 | Zhang .................. H04J 13/102 375/140 |
| 2014/0185551 A1* | 7/2014 | Sanderovich ......... H04L 1/0015 370/329 |
| 2014/0269770 A1 | 9/2014 | Kenney et al. |

OTHER PUBLICATIONS

European Search Report for European Patent Application No. 16747047.5, dated Mar. 26, 2019, 10 pages.

International Preliminary Report on Patentability for PCT/US2016/015899, dated Aug. 17, 2017, 10 pages.

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

International Search Report and Written Opinion for PCT/US2016/015899, dated Jun. 13, 2016, 13 pages.

Notice of Allowance for U.S. Appl. No. 14/749,659, dated Jan. 17, 2017, 19 pages.

* cited by examiner

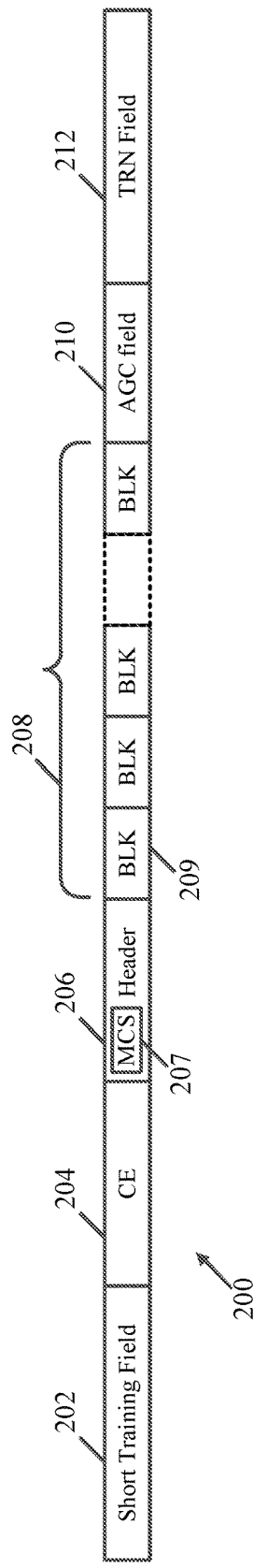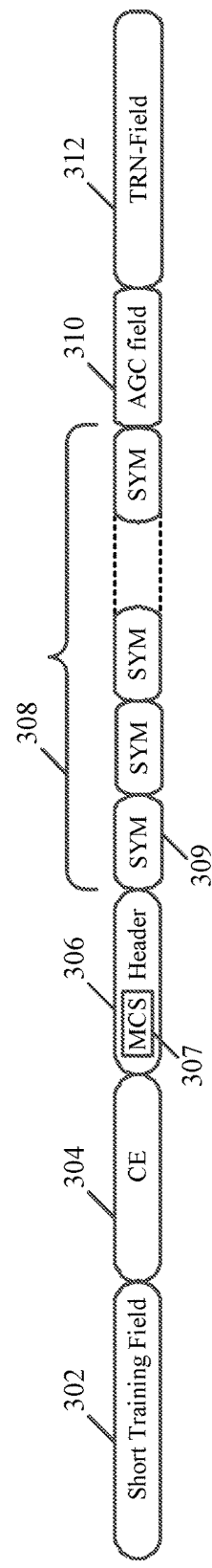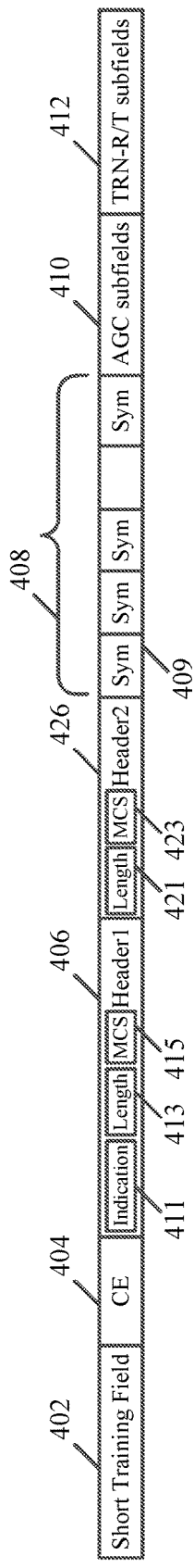
Fig. 2
Fig. 3
Fig. 4

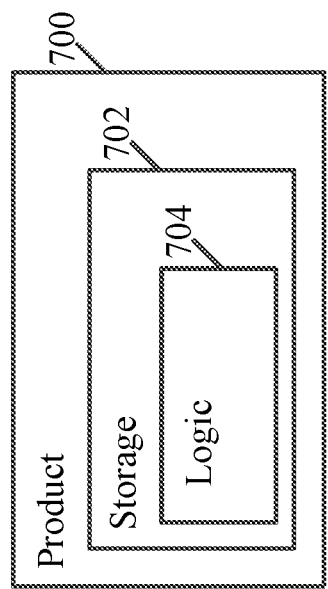

APPARATUS, SYSTEM AND METHOD OF COMMUNICATING A WIRELESS TRANSMISSION ACCORDING TO A PHYSICAL LAYER SCHEME

CROSS REFERENCE

This application claims the benefit of and priority from U.S. Provisional Patent Application No. 62/110,687 entitled "Apparatus, System and Method of Communicating a Wireless Transmission According to a Physical Layer Scheme", filed Feb. 2, 2015, the entire disclosure of which is incorporated herein by reference.

TECHNICAL FIELD

Embodiments described herein generally relate to communicating a wireless transmission according to a Physical layer (PHY) scheme.

BACKGROUND

A wireless communication network in a millimeter-wave band may provide high-speed data access for users of wireless communication devices.

A wireless communication station may communicate a wireless transmission according to a Physical layer (PHY) scheme.

The Specification of IEEE 802.11ad-2012 ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012) defines four types of PHY schemes. Specifically, the IEEE 802.11ad-2012 defines four types of Physical Layer (PHY) schemes for communication, e.g., Single Carrier (SC), Orthogonal Frequency Division Multiplexing (OFDM), Low Power SC. (LPSC), and control PHY.

According to the Specification of IEEE 802.11ad-2012, supporting reception of transmissions using basic SC modulations and Control PHY may be mandatory for all devices, while supporting OFDM and LPSC transmissions may be optional.

Accordingly, a device supporting only the SC and Control PHY configurations may not be able to decode OFDM and/or LPSC packets.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 2 is a schematic block diagram illustration of a Single Carrier (SC) frame structure, in accordance with some demonstrative embodiments.

FIG. 3 is a schematic block diagram illustration of an Orthogonal Frequency Division Multiplexing (OFDM) frame structure, in accordance with some demonstrative embodiments.

FIG. 4 is a schematic block diagram illustration a frame structure including two headers, in accordance with some demonstrative embodiments.

FIG. 7 is a schematic illustration of a product of manufacture, in accordance with some demonstrative embodiments.

DETAILED DESCRIPTION

Figure 1:
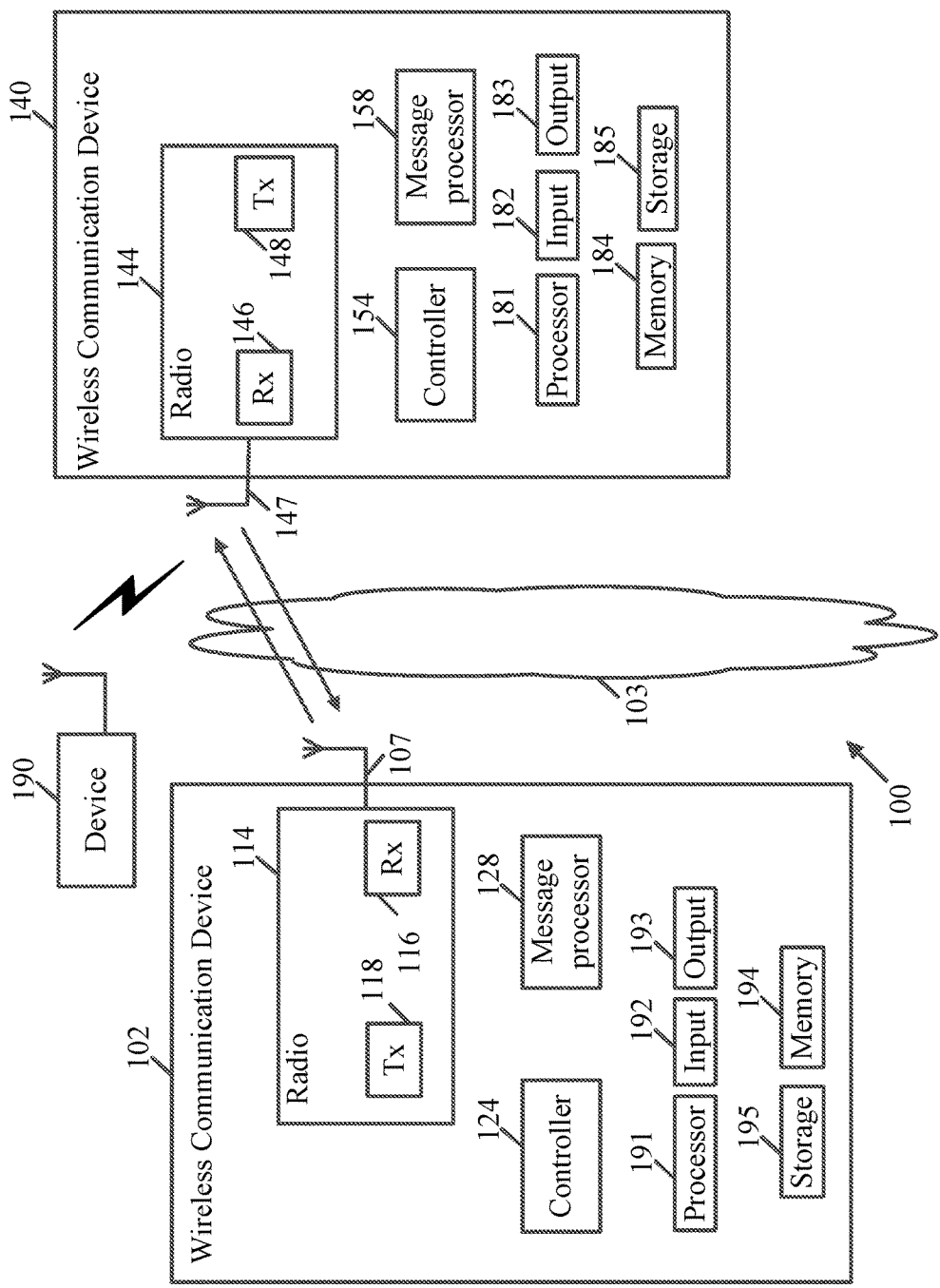
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, an Internet of Things (IoT) device, a sensor device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11 ay Standard for Information Technology—Telecommunications and Information Exchange Between Systems Local and Metropolitan Area Networks—Specific Requirements Part 11: Wireless IAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include wireless communication devices 102, 140 and/or 190.

In some demonstrative embodiments, devices 102 and/or 140 may include and/or perform the functionality of one or more STAs. For example, device 102 may include at least one STA, and/or device 140 may include at least one STA.

In some demonstrative embodiments, devices 102 and/or 140 may include and/or perform the functionality of one or more DMG STAs. For example, device 102 may include at least one DMG STA, and/or device 140 may include at least one DMG STA.

In some demonstrative embodiments, devices 102, 140 and/or 190 may include a mobile device or a non-mobile, e.g., a static, device. For example, devices 102 and/or 140 may include, for example, a UE, an MD, a STA, an AP, a PC, a desktop computer, a mobile computer, a laptop computer, an Ultrabook™ computer, a notebook computer, a tablet computer, an Internet of things (IoT) device, a sensor device, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components.

In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102, 140 and/or 190 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel. For example, WM 103 may include a millimeter-wave (mmWave) wireless communication channel.

In some demonstrative embodiments, WM 103 may include a DMG channel. In other embodiments WM 103 may include any other directional channel.

In other embodiments, WM 103 may include any other type of channel over any other frequency band.

In some demonstrative embodiments, devices 102, 140 and/or 190 may include one or more radios including circuitry and/or logic to perform wireless communication between devices 102, 140, 190 and/or one or more other wireless communication devices. For example, device 102 may include a radio 114, and/or device 140 may include at least one radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be steered to a plurality of beam directions.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, 140 and/or 190 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below. In one example, message processor 158 may be configured to process transmission of one or more messages from a wireless station, e.g., a wireless STA implemented by device 140; and/or message processor 158 may be configured to process reception of one or more messages by a wireless station, e.g., a wireless STA implemented by device 140.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 104.

In some demonstrative embodiments, at least part of the functionality of controller 124 and/or message processor 128 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more any additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more any additional or alternative elements of device 140.

In some demonstrative embodiments, devices 102, 140 and/or 190 may be configured to support and/or perform communication according to one or more Physical layer (PHY) schemes, configurations and/or types ("PHY configurations" or "PHY schemes").

In some demonstrative embodiments, devices 102, 140 and/or 190 may be configured to support transmissions according to one or more types of physical layers (PHY), e.g., one or more of four types of physical layers or any other number of PHY types.

In some demonstrative embodiments, devices 102, 140 and/or 190 may be configured to support transmissions according to one or more of a Single Carrier (SC) PHY, an OFDM PHY, a Low Power SC (LPSC) PHY, a Control PHY, and/or any other PHY type.

In some demonstrative embodiments, devices 102, 140 and/or 190 may be configured to support transmissions according to the SC PHY, the OFDM PHY, the LPSC PHY and/or the Control PHY, for example, in accordance with PHY schemes of an IEEE Specification, for example, an IEEE 802.11 Specification, e.g., IEEE 802.11ad-2012, IEEE 802.11REVmc, and/or any other Specification and/or protocol.

In some demonstrative embodiments, devices of system 100, e.g., devices 102, 140 and/or 190, may be required to support one or more PHY configurations, while support of one or more other PHY configurations may be optional.

In one example, reception of SC transmissions, e.g., basic SC modulations, and Control PHY transmissions, may be defined as mandatory for all devices of system 100, e.g., including devices 102, 140 and/or 190, while supporting OFDM PHY, LPSC PHY, and/or one or more other PHY configurations may be optional.

In some demonstrative embodiments, one or more devices of system 100, e.g., devices 102 and/or 140, may support one or more PHY configurations, for example, including at least OFDM PHY and/or LPSC PHY, for example, in addition to supporting SC PHY and/or Control PHY.

In some demonstrative embodiments, one or more devices of system 100, e.g., device 190, may not support OFDM PHY, LPSC PHY and/or one or more other PHY configurations, e.g., while supporting SC PHY and/or Control PHY.

In some demonstrative embodiments, one or more portions of packets ("OFDM and/or LPSC packets") transmitted according to the OFDM PHY and/or LPSC PHY schemes may have a modulation and/or coding scheme, which may not be supported by the SC PHY and/or the Control PHY.

In some demonstrative embodiments, a device not supporting OFDM PHY and/or LPSC PHY, for example, a device supporting only SC PHY ("SC only device"), e.g., device 190, may not be able to demodulate and/or decode one or more portions of the OFDM and/or LPSC packets, for example, if the one or more portions are modulated and/or encoded using a modulation and/or encoding scheme, which is different from a modulation and coding scheme supported by the SC PHY and/or the Control PHY.

In one example, the SC only device, e.g., device 190, may not be able to demodulate and/or decode a header of a packet, for example, if the header is modulated and/or encoded using a modulation and/or encoding scheme, which may be different from a modulation and/or encoding scheme supported by the SC PHY and/or the Control PHY.

In another example, the SC only device, e.g., device 190, may not be able to perform a correct channel estimation based on a channel estimation (CE) field of a packet, for example, if the CE field includes a CE sequence configured according to a modulation and/or encoding scheme, which may be different from a SC modulation and/or encoding scheme.

According to these embodiments, the SC only device, e.g., device 190, may not be able to determine a length and/or duration, e.g., a Transmit time (TxTIME), of the packet. Therefore, the SC only device, e.g., device 190, may not be able to determine when it may be allowed to start a transmission. This situation may potentially result, for example, in a coexistence problem, e.g., a major coexistence problem, across PHYs, e.g., between devices supporting OFDM PHY and/or LPSC PHY, e.g., devices 102 and/or 140, and devices not supporting OFDM PHY and/or LPSC PHY, e.g., device 190.

In some demonstrative embodiments, a modulation of the OFDM and/or LPSC packet according to a scheme defined, for example, by the IEEE 802.11ad-2012 Specification, may not enable SC only devices, e.g., device 190, to determine the length (TXTIME) of packets which are OFDM or LPSC packets.

FIG. 2 schematically illustrates a SC frame structure of a frame 200 ("SC frame"), in accordance with some demonstrative embodiments.

In some demonstrative embodiments, the SC frame structure of FIG. 2 may be configured in accordance with an IEEE Specification, for example, an IEEE 802.11 Specification, e.g., an IEEE 802.11ad-2012 Specification, and/or any other Specification or Standard.

In some demonstrative embodiments, as shown in FIG. 2, frame 200 may include a short training field 202, a CE field 204, a header field 206, a data portion 208, e.g., including a plurality of data blocks (BLK) 209, an Automatic Gain Control (AGC) field 210, and/or a Training (TRN) field 212.

In some demonstrative embodiments, at least the CE field 204, the header field 206, and the data portion 208 may be encoded and/or modulated according to a SC PHY scheme. The SC PHY scheme may include, for example, a SC PHY modulation and/or coding scheme, for example, in accordance with an IEEE Specification, for example, an IEEE 802.11 Specification, e.g., an IEEE 802.11ad-2012 Specification, and/or any other Specification or Standard.

In some demonstrative embodiments, a LPSC PHY frame structure may be similar, e.g., for one or more of the embodiments described herein, to the frame structure of the SC PHY frame 200 of FIG. 2.

For example, an LPSC frame may have a structure similar to the structure of frame 200. In one example, header 206 may include a LPSC header, and data portion 208 may be encoded and/or modulated according to a LPSC PHY scheme. The LPSC PHY scheme may include, for example, a LPSC PHY modulation and/or coding scheme, for example, in accordance with an IEEE Specification, for example, an IEEE 802.11 Specification, e.g., an IEEE 802.11ad-2012 Specification, and/or any other Specification or Standard.

In some demonstrative embodiments, header field 206 may include a modulation and coding scheme (MCS) field 207 including an MCS value, e.g., as described below.

FIG. 3 schematically illustrates an OFDM frame structure of a frame 300 ("OFDM frame"), in accordance with some demonstrative embodiments.

In some demonstrative embodiments, the OFDM frame structure of FIG. 3 may be configured in accordance with an IEEE Specification, for example, an IEEE 802.11 Specification, e.g., an IEEE 802.11ad-2012 Specification, and/or any other Specification or Standard.

In some demonstrative embodiments, as shown in FIG. 3, frame 300 may include a short training field 302, a CE field 304, a header field 306, a data portion 308, e.g., including a plurality of OFDM Symbols (SYM) 309, and AGC field 310, and/or a Training (TRN) field 312.

In some demonstrative embodiments, header field 306 may include a modulation and coding scheme (MCS) field 307 including an MCS value, e.g., as described below.

In some demonstrative embodiments, the data portion 308 may be encoded and/or modulated according to an OFDM PHY scheme. The OFDM PHY scheme may include, for example, an OFDM PHY modulation and/or coding scheme, for example, in accordance with an IEEE Specification, for example, an IEEE 802.11 Specification, e.g., an IEEE 802.11ad-2012 Specification, and/or any other Specification or Standard.

In some demonstrative embodiments, the CE field 304 of the OFDM frame 300 may be different from the CE field 204 of the SC frame 200.

In some demonstrative embodiments, a number of bits in the header 206 (SC header) of frame 200 may be the same as a number of bits in the header 306 (OFDM header) of OFDM frame 300.

Referring back to FIG. 1, in some demonstrative embodiments, a device that supports OFDM PHY, e.g., device 102 and/or device 140, may be able to detect the CE field of an OFDM frame, e.g., CE field 304 (FIG. 3) of OFDM frame 300 (FIG. 3), which may be different from the CE field of a SC frame, e.g., CE field 204 (FIG. 2) of SC frame 200 (FIG. 2).

In some demonstrative embodiments, if the header of the OFDM frame, e.g., header 306 (FIG. 3), is modulated according to an OFDM modulation scheme, the device supporting OFDM PHY, e.g., device 102 and/or device 140, may be able to proceed to demodulate the header of the OFDM frame, for example, using an OFDM demodulation scheme, e.g., rather than a SC demodulation scheme.

In some demonstrative embodiments, if the header of the OFDM frame, e.g., header 306 (FIG. 3), is modulated according to an OFDM modulation scheme, a SC only receiver, e.g., device 190, may not be able to demodulate and/or decode the OFDM header and, therefore, the SC only receiver may not be able to determine the length of the OFDM frame.

In some demonstrative embodiments, the inability of the SC only receiver to demodulate the header of the OFDM frame may lead to a situation, in which the SC only device, e.g., device 190, may not be able correctly operate a virtual carrier sense function, e.g., which may be required for channel access, for example, since the SC only device may not be able to determine the actual length of the OFDM frame.

In some demonstrative embodiments, if the header of a LPSC frame, e.g., header 206 (FIG. 2) of a LPSC frame having a frame structure of FIG. 2, is modulated according to a LPSC modulation scheme, a device supporting LPSC PHY, e.g., device 102 and/or device 140, may be able to proceed to demodulate the header of the LPSC frame, for example, using a LPSC demodulation scheme, e.g., rather than a SC demodulation scheme.

In some demonstrative embodiments, if the header of the LPSC frame, e.g., header 206 (FIG. 2) of the LPSC frame, is modulated according to a LPSC modulation scheme, a SC only receiver, e.g., device 190, may not be able to demodulate and/or decode the LPSC header and, therefore, the SC only receiver may not be able to determine the length of the LPSC frame.

In some demonstrative embodiments, the inability of the SC only receiver to demodulate the header of the LPSC frame may lead to a situation, in which the SC only device, e.g., device 190, may not be able correctly operate a virtual carrier sense function, e.g., which may be required for channel access, for example, since the SC only device may not be able to determine the actual length of the LPSC frame.

In some demonstrative embodiments, a device, e.g., device 102, may be configured to transmit an OFDM frame and/or a LPSC frame, for example, to another device, e.g., device 140, which may be configured to support OFDM PHY and/or LPSC PHY. The OFDM frame and/or a LPSC frame may be configured to enable a device, e.g., device 190, which does not support OFDM PHY and/or LPSC PHY, to demodulate and/or decode one or more portions of the OFDM frame and/or a LPSC frame, for example, in a manner which may be sufficient to determine a duration of the OFDM frame and/or a LPSC frame, e.g., as described below.

In some demonstrative embodiments, device 102 and/or device 140 may be configured to support transmission and/or reception of both OFDM frames and LPSC frames. In other embodiments, device 102 and/or device 140 may be configured to support transmission and/or reception of OFDM frames, e.g., while not being able to support transmission and/or reception of LPSC frames. In other embodiments, device 102 and/or device 140 may be configured to support transmission and/or reception of LPSC frames, e.g., while not being able to support transmission and/or reception of OFDM frames.

In some demonstrative embodiments, device 102 may be configured to transmit a packet using a single preamble and/or header format, which may, for example, be applied with respect to packets of a plurality of PHY types, for example, including the OFDM PHY, the SC PHY, and/or the LPSC PHY, e.g., as described below.

In some demonstrative embodiments, the header of the frame may optionally be followed by another header, e.g., as described below.

In some demonstrative embodiments, device 102 may be configured to use the header fields of the OFDM and/or LPSC headers, while, for example, being configured to encode and/or modulate the header, for example, using the same bits as in SC, e.g., an encoding of a SC PHY header.

In some demonstrative embodiments, a device, e.g., device 102, may be configured to use the same header field and/or CE field structure for SC and OFDM and/or LPSC frames, for example, instead of using a different header field and/or CE field, e.g., as described below.

In some demonstrative embodiments, a device, e.g., device 102, may be configured to use the same CE field and/or header encoding and/or modulation for SC and OFDM and/or LPSC frames. In one example, the actual bits in the header may not be changed.

In some demonstrative embodiments, a device, e.g., device 140, that receives a frame with this header may be able to detect that the frame is an OFDM frame, a SC frame, or an LPSC frame, for example, by inspecting the field of the modulation and coding scheme (MCS) in the header, e.g., MCS field 207 (FIG. 2) for a SC frame or an LPSC frame, or field 307 (FIG. 3) for an OFDM frame, e.g., as described below.

In some demonstrative embodiments, an MCS field of a SC frame, for example, MCS field 207 (FIG. 2) may have an MCS value of a SC PHY scheme. For example, MCS field 207 (FIG. 2) may have a value within a first range of MCS values, e.g., an MCS value between 1-12, or any other range.

In some demonstrative embodiments, an MCS field of an OFDM frame, for example, MCS field 307 (FIG. 3) may have an MCS value of an OFDM PHY scheme. For example, MCS field 307 (FIG. 3) may have a value within a second range of MCS values, e.g., an MCS value between 13-24, or any other range.

In some demonstrative embodiments, an MCS field of an LPSC frame, for example, MCS field 207 (FIG. 2) may have an MCS value of an LPSC PHY scheme. For example, MCS field 207 (FIG. 2) may have a value within a third range of MCS values, e.g., an MCS value between 25-31, or any other range.

In some demonstrative embodiments, controller 124 may be configured to cause a wireless station, for example, a wireless station implemented by device 102, to generate a frame including a header and a data portion. For example, controller 124 may cause message processor 128 to generate the frame.

In some demonstrative embodiments, the header of the frame may include an MCS value of an OFDM PHY scheme or an LPSC PHY scheme.

In some demonstrative embodiments, the frame may include an OFDM frame, e.g., having a frame structure of FIG. 3. According to these embodiments, the header of the frame, e.g., header 306 (FIG. 3), may include an MCS field, e.g., MCS field 307 (FIG. 3), having an MCS value of an OFDM PHY scheme, e.g., as described below.

In some demonstrative embodiments, the frame may include an LPSC frame, having an LPSC frame structure, e.g., in accordance with the frame structure of FIG. 2. According to these embodiments, the header of the frame, e.g., header 206 (FIG. 2), may include an MCS field, e.g., MCS field 207 (FIG. 2), having an MCS value of an LPSC PHY scheme, e.g., as described below.

In some demonstrative embodiments, controller 124 may cause the wireless station to modulate and encode the header according to a SC PHY scheme, for example, using a modulation and encoding scheme of a SC PHY header.

In some demonstrative embodiments, the frame may include an OFDM frame, e.g., having a frame structure of FIG. 3. According to these embodiments, controller 124 may cause the wireless station to modulate and encode the header of the frame, e.g., header 306 (FIG. 3), according to the SC PHY scheme, e.g., as described below.

In some demonstrative embodiments, the frame may include an LPSC frame, having an LPSC frame structure, e.g., in accordance with the frame structure of FIG. 2. According to these embodiments, controller 124 may cause the wireless station to modulate and encode the header of the frame, e.g., header 206 (FIG. 2), according to the SC PHY scheme, e.g., as described below.

In some demonstrative embodiments, controller 124 may cause the wireless station to modulate and encode the data portion according to the OFDM PHY scheme or the LPSC PHY scheme.

In some demonstrative embodiments, the frame may include an OFDM frame, e.g., having a frame structure of FIG. 3. According to these embodiments, controller 124 may cause the wireless station to modulate and encode the data portion of the frame, e.g., data portion 308 (FIG. 3), according to the OFDM PHY scheme, e.g., as described below.

In some demonstrative embodiments, the frame may include an LPSC frame, having an LPSC frame structure, e.g., in accordance with the frame structure of FIG. 2.

According to these embodiments, controller 124 may cause the wireless station to modulate and encode the data portion the frame, e.g., data portion 208 (FIG. 2), according to the LPSC PHY scheme, e.g., as described below.

In some demonstrative embodiments, controller 124 may cause the wireless station to process transmission of the frame. For example, controller 124 may cause radio 114 to transmit the frame.

In some demonstrative embodiments, controller 124 may set the MCS value in the MCS field of the header of frame, for example, based on the PHY scheme to modulate the data portion of the frame, e.g., as described below.

In some demonstrative embodiments, controller 124 may cause the wireless station to set the MCS value, e.g., in MCS field 307 (FIG. 3), to a value between 13 and 24, and to modulate and encode the data portion, e.g., data portion 308 (FIG. 3), according to the OFDM PHY scheme.

In some demonstrative embodiments, controller 124 may cause the wireless station to set the MCS value, e.g., in MCS field 207 (FIG. 2), to a value between 25 and 31, and to modulate and encode the data portion, e.g., data portion 208 (FIG. 2), according to the LPSC PHY scheme.

In some demonstrative embodiments, controller 124 may cause the wireless station to process transmission of the header of the frame, e.g., header 306 (FIG. 3), over a single carrier, and the data portion of the frame, e.g., data portion 308 (FIG. 3), over a multi-carrier, for example, if the frame is an OFDM frame.

In some demonstrative embodiments, controller 124 may cause the wireless station to process transmission of the header of the frame, e.g., header 206 (FIG. 2), and the data portion of the frame, e.g., data portion 208 (FIG. 2), over a single carrier, for example, if the frame is an LPSC frame.

In some demonstrative embodiments, controller 154 may be configured to cause a wireless station, for example, a wireless station implemented by device 140, to process reception of a frame ("the received frame") including a header and a data portion. For example, controller 154 may cause radio 144 and/or message processor 158 to process reception of the frame.

In one example, the received frame may include the frame transmitted by device 102.

In some demonstrative embodiments, the header of the received frame may include an MCS value of an OFDM PHY scheme or an LPSC PHY scheme.

In some demonstrative embodiments, the received frame may include an OFDM frame, e.g., having a frame structure of FIG. 3. According to these embodiments, the header of the received frame, e.g., header 306 (FIG. 3), may include an MCS field, e.g., MCS field 307 (FIG. 3), having an MCS value of an OFDM PHY scheme, e.g., as described below.

In some demonstrative embodiments, the received frame may include an LPSC frame, having an LPSC frame structure, e.g., in accordance with the frame structure of FIG. 2. According to these embodiments, the header of the received frame, e.g., header 206 (FIG. 2), may include an MCS field, e.g., MCS field 207 (FIG. 2), having an MCS value of an LPSC PHY scheme, e.g., as described below.

In some demonstrative embodiments, controller 154 may cause the wireless station to demodulate and decode the header of the received frame according to a SC PHY scheme.

In some demonstrative embodiments, the received frame may include an OFDM frame, e.g., having a frame structure of FIG. 3. According to these embodiments, controller 154 may cause the wireless station to demodulate and decode the header of the received frame, e.g., header 306 (FIG. 3), according to the SC PHY scheme, e.g., as described below.

In some demonstrative embodiments, the received frame may include an LPSC frame, having an LPSC frame structure, e.g., in accordance with the frame structure of FIG. 2. According to these embodiments, controller 154 may cause the wireless station to demodulate and decode the header of the frame, e.g., header 206 (FIG. 2), according to the SC PHY scheme, e.g., as described below.

In some demonstrative embodiments, controller 154 may cause the wireless station to demodulate and decode the data portion of the received frame, for example, based on the MCS value in the header portion of the received frame.

In some demonstrative embodiments, controller 154 may cause the wireless station to demodulate and decode the data portion of the received frame according to the OFDM PHY scheme or the LPSC PHY scheme, for example, based on the MCS value in the header portion of the received frame.

In some demonstrative embodiments, controller 154 may cause the wireless station to demodulate and decode the data portion of the received frame, e.g., data portion 308 (FIG. 3), according to the OFDM PHY scheme, for example, when the MCS value, e.g., in MCS field 307 (FIG. 3), is between 13 and 24.

In some demonstrative embodiments, controller 154 may cause the wireless station to demodulate and decode the data portion of the received frame, e.g., data portion 208 (FIG. 2), according to the LPSC PHY scheme, for example, when the MCS value, e.g., in MCS field 207 (FIG. 2), is between 25 and 31.

In some demonstrative embodiments, controller 154 may cause the wireless station to process reception of the header of the frame, e.g., header 306 (FIG. 3), over a single carrier, and the data portion of the frame, e.g., data portion 308 (FIG. 3), over a multi-carrier.

In some demonstrative embodiments, controller 154 may cause radio 144 to process reception of the data portion of the received frame over a multi-carrier, for example, if the MCS value in the header portion of the received frame is an MCS value of an OFDM PHY scheme, e.g., an MCS value between 13 and 24.

In some demonstrative embodiments, controller 124 may cause the wireless station to process reception of the header of the received frame, e.g., header 206 (FIG. 2), and the data portion of the received frame, e.g., data portion 208 (FIG. 2), over a single carrier, for example, if the frame is an LPSC frame.

In some demonstrative embodiments, controller 154 may cause radio 144 to process reception of the data portion of the received frame over a single-carrier, for example, if the MCS value in the header portion of the received frame is an MCS value of an LPSC PHY scheme, e.g., an MCS value between 25 and 31.

In some demonstrative embodiments, the processing in the PHY layer of a device receiving a frame ("the receiving device"), e.g., device 140, may be pipelined. Accordingly, by the time the header of the received frame is decoded by the receiving device, the receiving device may have already started processing of a next symbol of the frame. The next symbol may be different for OFDM and SC, e.g., even in an initial time domain processing.

In some demonstrative embodiments, device 102 may be configured to possibly add one or more dummy elements, e.g., one dummy element, two dummy elements or more than two dummy elements, for example, following the header of the frame, e.g., before a "real" data element of the data portion of the frame.

In some demonstrative embodiments, the one or more dummy elements may include one or more OFDM symbols, for example, if the frame is an OFDM frame.

For example, controller 124 may cause message processor 128 to add one or more OFDM symbols, e.g., one or more dummy OFDM symbols, for example, following header portion 306 (FIG. 3), e.g., before the data symbols 309 (FIG. 3) of data portion 308 (FIG. 3), for example, when processing transmission of an OFDM frame.

In some demonstrative embodiments, the one or more dummy elements may include one or more LPSC blocks, for example, if the frame is an LPSC frame.

For example, controller 124 may cause message processor 128 to add one or more LPSC blocks, e.g., one or more dummy LPSC blocks, for example, following header portion 206 (FIG. 2), e.g., before the data blocks 209 (FIG. 2) of data portion 208 (FIG. 2), for example, when processing transmission of an LPSC frame.

In some demonstrative embodiments, the dummy elements may allow the device receiving the frame, for example, to decode the header portion of the received frame, e.g., before the first "real" data symbol or block is to be processed.

In some demonstrative embodiments, devices 102, 140 and/or 190 may be configured to communicate frames including a header, which may be modulated and encoded according to the SC PHY scheme, and may include the MCS value of the OFDM PHY scheme or the LPSC PHY scheme, e.g., as described above.

In some demonstrative embodiments, devices 102 and/or 140 may be configured to communicate frames having first and second headers, e.g., as described below.

In some demonstrative embodiments, device 102 may be configured to use a legacy, conventional or current SC header ("the first header") to "spoof" a SC device, e.g., device 190, to correct the right length for a packet, e.g., an OFDM packet or an LPSC packet.

In some demonstrative embodiments, device 102 may be configured to add another header ("the second header"), e.g., immediately following the first header, with "correct" OFDM or LPSC information, e.g., as described below.

In some demonstrative embodiments, the second header may be configured to be processed, for example, by a device, e.g., device 140, which may be configured to support OFDM PHY and/or LPSC PHY, e.g., as described below.

In some demonstrative embodiments, device 102 may be configured to generate and transmit a frame having the SC header ("the first header") followed by an additional header ("the second header"), e.g., configured for OFDM and/or LPSC.

FIG. 4 is a schematic block diagram illustration a frame structure of a frame 400 including two headers, in accordance with some demonstrative embodiments. In some demonstrative embodiments, device 102 (FIG. 1) may be configured to generate and transmit a frame, e.g., an OFDM frame or an LPSC frame, having the frame structure of FIG. 4, and/or device 140 (FIG. 1) may be configured to process reception of a frame, e.g., and OFDM frame of an LPSC frame, having the frame structure of FIG. 4, e.g., as described below.

In some demonstrative embodiments, as shown in FIG. 4, frame 400 may include a short training field 202, a CE field 204, a first header field 206, a second header field 426, a data portion 408, an Automatic Gain Control (AGC) field 410, and/or a Training (TRN) field 412.

In some demonstrative embodiments, as shown in FIG. 4, data portion 408 may include a plurality of OFDM symbols 409, e.g., if frame 400 is an OFDM frame.

In other embodiments, data portion 408 may include a plurality of data blocks (not shown), e.g., if frame 400 is an LPSC frame.

In some demonstrative embodiments, the first header 406 may be configured to have a structure, which may be in accordance with a header of a SC frame.

In some demonstrative embodiments, first header 406 may include a length field 413, which may include a first length value, and an MCS field 415, which may include a first MCS value.

In some demonstrative embodiments, the first header 406 may be configured to indicate a mandatory SC MCS value, and a length, which may, for example, cover the second header and one or more additional portions of the frame, e.g., including all additional OFDM symbols of an OFDM frame, or all LPSC blocks of an LPSC frame.

In some demonstrative embodiments, length field 413 may include the first length value configured according to a length of the second header 426 and the data portion 408.

In some demonstrative embodiments, the MCS field 415 may include the first MCS value within a range of MCS values in accordance with a SC PHY scheme. For example, the MCS field 415 may include the first MCS value in the range between 1 and 12.

In some demonstrative embodiments, the first header 406 may include an indication 411 of the second header 426.

In some demonstrative embodiments, indication 411 may be in the form of a bit of one of the reserved bits in a SC header or any other indication or bit, to indicate that the second header 426 follows the first header 406. For example, controller 124 (FIG. 1) may set a reserved bit in header 406 to a predefined value, e.g., one, to indicate presence of the second header 426.

In some demonstrative embodiments, the second header 426 may include a length field 421, which may include a second length value, and an MCS field 423, which may include a second MCS value. The second header 426 may optionally include one or more additional fields, e.g., one or more OFDM or LPSC fields.

In some demonstrative embodiments, MCS field 423 may include an MCS value corresponding to an MCS to be applied to the data portion 408.

In some demonstrative embodiments, MCS field 423 may include an MCS value of the OFDM PHY scheme ("OFDM MCS"), e.g., an MCS value between 13 and 24, for example, if data portion 408 is to be modulated and encoded according to an OFDM PHY scheme, e.g., if the frame is an OFDM frame.

In some demonstrative embodiments, MCS field 423 may include an MCS value of the LPSC PHY scheme ("LPSC MCS value"), e.g., an MCS value between 25 and 31, for example, if data portion 408 is to be modulated and encoded according to an LPSC PHY scheme, e.g., if the frame is an LPSC frame.

In some demonstrative embodiments, the length field 411 may include an indication of the actual length of the frame.

In some demonstrative embodiments, the length field 411 may include the second length value configured, for example, according to at least a length of the data portion 408.

In some demonstrative embodiments, the first MCS value in the MCS field 415 of the first header may be set, for example, to indicate whether or not the frame 400 is an OFDM frame or an LPSC frame.

In one example, controller 124 (FIG. 1) may set the first MCS value in the MCS field 415 of the first header 406 to a first value, for example, "1", to indicate the frame is an OFDM frame.

In another example, controller 124 (FIG. 1) may set the first MCS value in the MCS field 415 of the first header 406 to a second value, for example, "2", to indicate the frame is an LPSC frame.

In some demonstrative embodiments, setting the MCS value in the first header 406 to indicate whether the frame 400 is an OFDM frame or an LPSC frame may enable, for example, to provide an early indication of the frame type to a device receiving the frame 400, e.g., device 140 (FIG. 1). The device receiving the packet, e.g., device 140 (FIG. 1), may be able to use this indication, for example, to prepare for the demodulation and/or decoding of the symbols or bits following the header 406.

In some demonstrative embodiments, setting the MCS value in the first header 406 to an MCS value according to a SC PHY scheme, e.g., a value between 1 and 12, may have an advantage, for example, of allowing some devices, for example, legacy devices, e.g., device 190, already in the market, to support demodulating and/or decoding the length of OFDM and/or LPSC packets. For example, otherwise, these devices may interpret a header with an OFDM or LPSC MCS as an illegal SC header, and may drop the packet including frame 400.

In some demonstrative embodiments, the first length value, which may be included in the length field 413, may include a number of SC blocks corresponding at least to the length of the second header 426 and the data portion 408, e.g., as described below.

In some demonstrative embodiments, controller 124 (FIG. 1) may be configured to determine the first length value, denoted Length, to be included in the length field 413 of the first header 406, for example, based on a length of data portion 408, denoted $T_{data}$.

For example, controller 124 (FIG. 1) may be configured to determine the length $T_{data}$ e.g., as $T_{data} = N_{SYM} * T_{SYM}$, for example, wherein $N_{SYM}$ denotes a number of symbols in the frame 400, and $T_{SYM}$ denotes a length of a symbol.

In some demonstrative embodiments, device 102 may determine the value Length, for example, as follows:

$$\text{Length} = 14 \lceil (T_{data} + T_{headers_{SC}} - T_{GI}) / T_{BLK} \rceil \quad (1)$$

wherein $T_{BLK}$ denotes a time of a single SC block, e.g., 512/1760 microseconds (usecs), wherein $T_{header_{SC}}$ denotes a duration of a SC header, and wherein $T_{GI}$ denotes a Guard Interval duration, e.g., in accordance with an IEEE 802.11 standard, e.g., IEEE 802.11ad-2012 or any other Specification or protocol.

In some demonstrative embodiments, the second header 426 may be encoded and/or modulated, for example, in the same way as the first header 406.

In some demonstrative embodiments, the first header 406 and the second header 426 may be modulated and encoded according to a SC PHY scheme.

In one example, the first header 406 ("SC header") may include at least one or more of the following fields:

TABLE 1

| Field Name | Number of bits | Start bit | Description |
|---|---|---|---|
| Scrambler Initialization | 7 | 0 | Bits X1-X7 of the initial scrambler state. |
| MCS | 5 | 7 | Index into the Modulation and Coding Scheme table |
| Length | 18 | 12 | Number of data octets in the PSDU. Range 1-262143 |
| Additional PPDU | 1 | 30 | Contains a copy of the parameter ADD-PPDU from the TXVECTOR. A value of 1 indicates that this PPDU is immediately followed by another PPDU with no IFS or preamble on the subsequent PPDU. A value of 0 indicates that no additional PPDU follows this PPDU. |
| Packet Type | 1 | 31 | Corresponds to the TXVECTOR parameter PACKETTYPE. Packet Type = 0 indicates either a PPDU whose data part is followed by one or more TRN subfields (when the Beam Tracking Request field is 0 or in Control PHY), or a PPDU that contains a request for TRN subfields to be appended to a future response PPDU (when the Beam Tracking Request field is 1). Packet Type = 1 indicates a PPDU whose data part is followed by one or more TRN subfields. The field is reserved when the Training Length field is 0. |
| Training Length | 5 | 32 | Corresponds to the TXVECTOR parameter TRN-LEN. If the Beam Tracking Request field is 0, the Training Length field indicates the length of the training field. The use of this field is defined in 21.10.2.2.3. A value of 0 indicates that no training field is present in this PPDU. If the Beam Tracking Request field is 1 and the Packet Type field is 1, the Training Length field indicates the length of the training field. If the Packet Type field is 0, the Training Length field indicates the length of the training field requested for receive training. |
| Aggregation | 1 | 37 | Set to 1 to indicate that the PPDU in the data portion of the packet contains an A-MPDU; otherwise, set to 0. |
| Beam Tracking Request | 1 | 38 | Corresponds to the TXVECTOR parameter BEAM_TRACKING_REQUEST. Set to 1 to indicate the need for beam tracking (9.38.7); otherwise, set to 0. The Beam Tracking Request field is reserved when the Training Length field is 0. |
| Last RSSI | 4 | 39 | Contains a copy of the parameter LAST_RSSI from the TXVECTOR. When set to 0, this field reserved and ignored by the receiver. The value is an unsigned integer: Values of 2-14 represent power levels (-71 + value × 2) dBm. A value of 15 represents a power greater than or equal to -42 dBm. A value of 1 represents a power less than or equal to -68 dBm. Value of 0 indicates that the previous packet was not received a SIFS period before the current transmission. |
| Turnaround | 1 | 43 | As defined in Table 21-1. |
| Reserved | 3 | 44 | Set to 0, ignored by the receiver |
| OFDM or LPSC follows | 1 | 47 | Set to 1 to indicate that an additional header (OFDM or LPSC follows this header) |
| HCS | 16 | 48 | Header check sequence |

In one example, the second header 426, e.g., an "OFDM header" for an OFDM packet, may follow the first header 406, e.g., the header of Table 1, and may include at least one or more of the following fields:

TABLE 2

| Field Name | Number of bits | Start Bit | Description |
|---|---|---|---|
| MCS | 5 | 0 | Index into the Modulation and Coding Scheme table |
| Length | 18 | 5 | Number of data octets in the PSDU. Range 1-262143. |
| Tone Pairing Type | 1 | 23 | Set to 0 to indicate Static Tone Pairing (21.5.3.2.4.6.2); Set to 1 to indicate Dynamic Tone Pairing (21.5.3.2.4.6.3). Only valid if MCS field value is in the range of 13-17; otherwise reserved. |
| DTP Indicator | 1 | 24 | Bit flip used to indicate DTP update. Only valid when the Tone Pairing Type field is 1 and the MCS field value is in the range of 13-17; otherwise reserved. |
| Reserved | 23 | 25 | Set 0, ignored by receiver |
| HCS | 16 | 48 | Header check sequence. Definition of this field calculation in 21.5.3.1.3 |

In some demonstrative embodiments, the header 406 and/or the header 426 may include any other additional or alternative field and/or parameters.

In some demonstrative embodiments, the header modulation of the SC header 406 may include transmitting the header block 406 twice, while the second header 426, e.g., the new header, may be transmitted, for example, only once.

Referring back to FIG. 1, in some demonstrative embodiments, controller 124 may be configured to cause a wireless station, for example, a wireless station implemented by device 102, to generate a frame including first and second headers, e.g., in accordance with the structure of frame 400 (FIG. 1). For example, controller 124 may cause message processor 128 to generate the frame.

In some demonstrative embodiments, controller 124 may cause the wireless station to generate a frame, e.g., frame 400 (FIG. 4) including at least a CE field, e.g., CE field 404 (FIG. 4), a first header, e.g., header 406 (FIG. 4), a second header, e.g., header 426 (FIG. 4), and a data portion, e.g., data portion 408 (FIG. 4).

In some demonstrative embodiments, the first header may include an indication of the second header, e.g., indication 411 (FIG. 4).

In some demonstrative embodiments, the first header may include a first length value, e.g., in the length field 413 (FIG. 4), configured according to a length of the second header and the data portion.

In some demonstrative embodiments, the first length value may include a number of SC blocks corresponding to the length of at least the second header and the data portion, e.g., according to Equation 1.

In some demonstrative embodiments, the first header may include a first MCS value, e.g., in the MCS field 415 (FIG. 4).

In some demonstrative embodiments, the second header may include a second length value, e.g., in the length field 421 (FIG. 4), which may be configured according to a length of the data portion.

In some demonstrative embodiments, the second header may include a second MCS value, e.g., in the MCS field 423 (FIG. 4).

In some demonstrative embodiments, the first MCS value may include a value in a range of MCS values of a SC PHY scheme, for example, a value between 1 and 12.

In some demonstrative embodiments, controller 124 may set the MCS value in the MCS field, e.g., MCS field 423 (FIG. 4), of the second header, e.g., header 426 (FIG. 4), according to a modulation and coding scheme to be applied to the data portion, e.g., data portion 408 (FIG. 4).

In some demonstrative embodiments, the second MCS value may include a value in a range of MCS values of an OFDM PHY scheme, e.g., a value between 13 and 24, for example, if the data portion is to be modulated and encoded according to an OFDM PHY scheme.

In some demonstrative embodiments, the second MCS value may include a value in a range of MCS values of an LPSC PHY scheme, e.g., a value between 25 and 31, for example, if the data portion is to be modulated and encoded according to an LPSC PHY scheme.

In some demonstrative embodiments, controller 124 may cause the wireless station to modulate and encode the CE field, the first header, and the second header according to a SC PHY scheme. For example, controller 124 may cause the wireless station to modulate and encode CE field 404 (FIG. 4), header 406 (FIG. 4), and header 406 (FIG. 4) according to the SC PHY scheme.

In some demonstrative embodiments, controller 124 may cause the wireless station to modulate and encode the data portion according to the OFDM PHY scheme or the LPSC PHY scheme.

In some demonstrative embodiments, the frame may include an OFDM frame. According to these embodiments, controller 124 may cause the wireless station to modulate and encode the data portion of the frame, e.g., data portion 408 (FIG. 4), according to the OFDM PHY scheme.

In some demonstrative embodiments, the frame may include an LPSC frame, having an LPSC frame structure. According to these embodiments, controller 124 may cause the wireless station to modulate and encode the data portion the frame, e.g., data portion 408 (FIG. 4), according to the LPSC PHY scheme, e.g., as described below.

In some demonstrative embodiments, controller 124 may cause the wireless station to process transmission of the frame. For example, controller 124 may cause radio 114 to transmit the frame.

In some demonstrative embodiments, controller 124 may cause the wireless station to process transmission of the first and/or second headers of the frame, e.g., header 406 (FIG. 4) and header 426 (FIG. 4), over a single carrier, and/or the data portion of the frame, e.g., data portion 408 (FIG. 4), over a multi-carrier, for example, if the frame is an OFDM frame.

In some demonstrative embodiments, controller 124 may cause the wireless station to process transmission of the first and/or second headers of the frame, e.g., header 406 (FIG. 4) and header 426 (FIG. 4), and/or the data portion of the frame, e.g., data portion 408 (FIG. 4), over a single carrier, for example, if the frame is an LPSC frame.

In some demonstrative embodiments, controller 154 may be configured to cause a wireless station, for example, a wireless station implemented by device 140, to process reception of a frame ("the received frame") including first and second headers and a data portion, e.g., according to the structure of frame 400 (FIG. 4). For example, controller 154 may cause radio 144 and/or message processor 158 to process reception of the frame.

In one example, the received frame may include the frame transmitted by device 102.

In some demonstrative embodiments, controller 154 may cause the wireless station to demodulate and decode the CE field, e.g., CE field 404 (FIG. 4), the first header, e.g., header 406 (FIG. 4), and/or the second header, e.g., header 426 (FIG. 4), according to a SC PHY scheme.

In some demonstrative embodiments, the second header of the received frame, e.g., header 426 (FIG. 4), may include an MCS value of an OFDM PHY scheme or an LPSC PHY scheme, e.g., in MCS field 423 (FIG. 4).

In some demonstrative embodiments, controller 154 may cause the wireless station to demodulate and decode the data portion of the received frame according to the OFDM PHY scheme or the LPSC PHY scheme, for example, based on the second MCS value in the second header portion of the received frame, e.g., the MCS value in MCS field 423 (FIG. 4).

In some demonstrative embodiments, controller 154 may cause the wireless station to demodulate and decode the data portion of the received frame, e.g., data portion 408 (FIG. 4), according to the OFDM PHY scheme, for example, when the MCS value, e.g., in MCS field 423 (FIG. 4), is between 13 and 24.

In some demonstrative embodiments, controller 154 may cause the wireless station to demodulate and decode the data portion of the received frame, e.g., data portion 408 (FIG. 4), according to the LPSC PHY scheme, for example, when the MCS value, e.g., in MCS field 423 (FIG. 4), is between 25 and 31.

In some demonstrative embodiments, controller 154 may cause the wireless station to process reception of the first and/or second headers of the frame, e.g., headers 406 and 426 (FIG. 4), over a single carrier, and/or the data portion of the frame, e.g., data portion 408 (FIG. 4), over a multi-carrier.

In some demonstrative embodiments, controller 154 may cause radio 144 to process reception of the data portion of the received frame over a multi-carrier, for example, if the MCS value in the second header of the received frame, e.g., the MCS value in MCS field 423 (FIG. 4), is an MCS value of an OFDM PHY scheme, e.g., an MCS value between 13 and 24.

In some demonstrative embodiments, controller 124 may cause the wireless station to process reception of the first and/or second headers of the frame, e.g., headers 406 and 426 (FIG. 4), and/or the data portion of the received frame, e.g., data portion 408 (FIG. 4), over a single carrier, for example, if the frame is an LPSC frame.

In some demonstrative embodiments, controller 154 may cause radio 144 to process reception of the data portion of the received frame over a single-carrier, for example, if the MCS value in the second header of the received frame, e.g., the MCS value in MCS field 423 (FIG. 4), is an MCS value of an LPSC PHY scheme, e.g., an MCS value between 25 and 31.

In some demonstrative embodiments, another device, e.g., device 190, may be able to demodulate and decode the first header, e.g., header 406 (FIG. 4), and to determine the duration of the frame, e.g., based on the length indicated by the length field of the first header, e.g., length field 413 (FIG. 4), for example, even if device 190 (FIG. 1) is not capable of supporting the OFDM PHY scheme and/or the LPSC PHY scheme.

Figure 5:
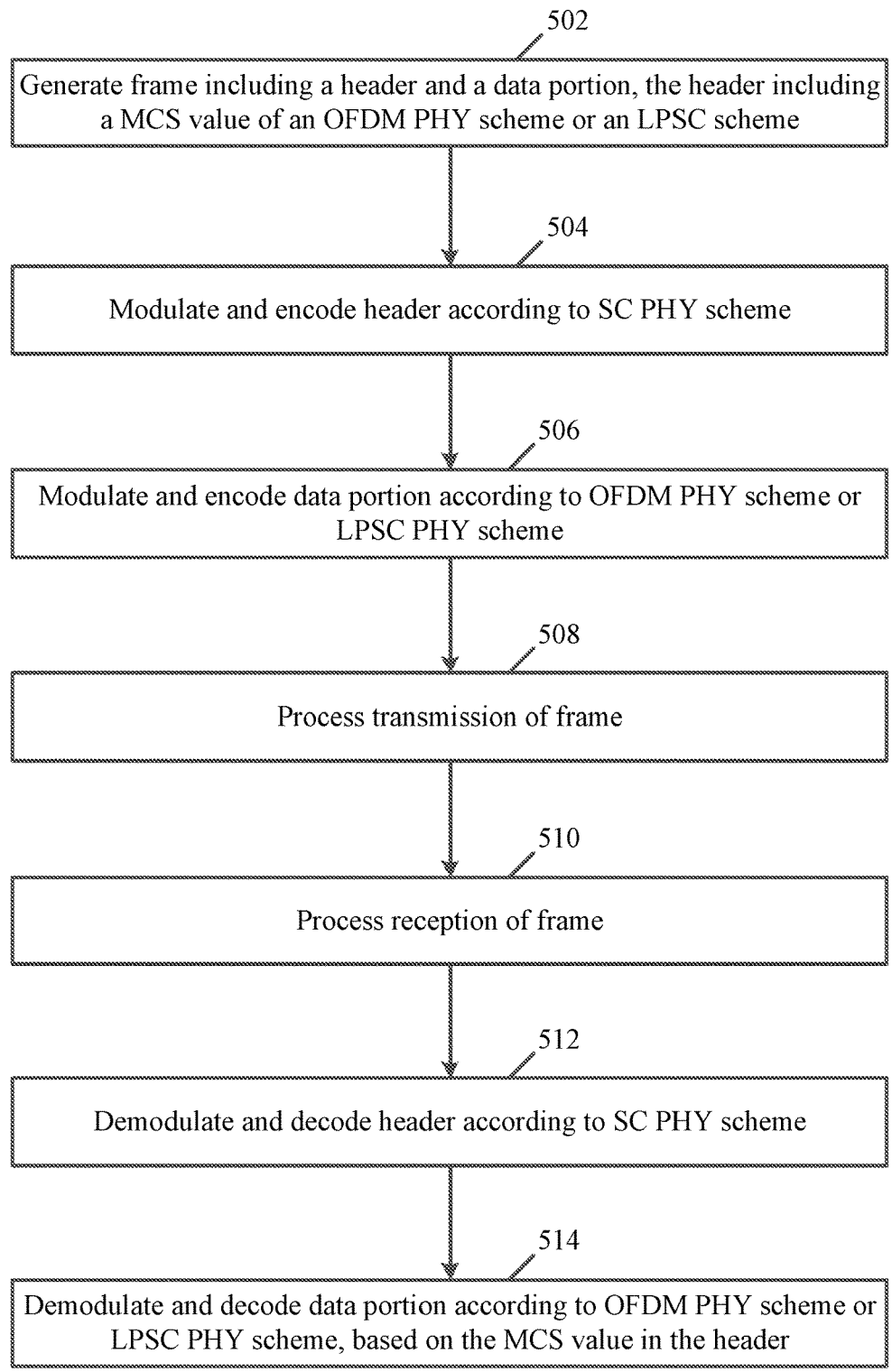
FIG. 5 is a schematic flow-chart illustration of a method of communicating a frame, in accordance with some demonstrative embodiments.

Reference is made to FIG. 5, which schematically illustrates a method of communicating a wireless transmission according to a PHY scheme, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 502, the method may include generating a frame including a header and a data portion, the header including an MCS value of an OFDM PHY scheme or an LPSC PHY scheme. For example, controller 124 (FIG. 1) may cause message processor 128 (FIG. 1) to generate frame 300 (FIG. 3) including the MCS value of the OFDM PHY scheme in header 306 (FIG. 3); or to generate frame 200 (FIG. 2) including the MCS value of the LPSC PHY scheme in header 206 (FIG. 2), e.g., as described above.

As indicated at block 504, the method may include modulating and encoding the header according to a SC PHY scheme. For example, controller 124 (FIG. 1) may cause device 102 (FIG. 1) to modulate and encode the header according to the SC PHY scheme, e.g., as described above.

As indicated at block 506, the method may include modulating and encoding the data portion according to the OFDM PHY scheme or the LPSC PHY scheme. For example, controller 124 (FIG. 1) may cause device 102 (FIG. 1) to modulate and encode the data portion according to the OFDM PHY scheme or the LPSC PHY scheme, for example, according to the MCS value, e.g., as described above.

As indicated at block 508, the method may include processing transmission of the frame. For example, For example, controller 124 (FIG. 1) may cause device 102 (FIG. 1) to process transmission of the frame, e.g., as described above.

As indicated at block 510, the method may include processing reception of the frame. For example, controller 154 (FIG. 1) may cause message processor 158 (FIG. 1) to process reception of the frame, e.g., as described above.

As indicated at block 512, the method may include demodulating and decoding the header of the frame according to a SC PHY scheme. For example, controller 154 (FIG. 1) may cause device 140 (FIG. 1) to demodulate and decode the header of the frame according to a SC PHY scheme, e.g., as described above.

As indicated at block 514, the method may include demodulating and decoding the data portion of the frame according to the OFDM PHY scheme or the LPSC PHY scheme, e.g., based on the MCS value in the header of the frame. For example, controller 154 (FIG. 1) may cause device 140 (FIG. 1) to demodulate and decode the data portion of the frame according to an OFDM PHY scheme or the LPSC PHY scheme, for example, based on the MCS value in the header of the frame, e.g., as described above.

Figure 6:
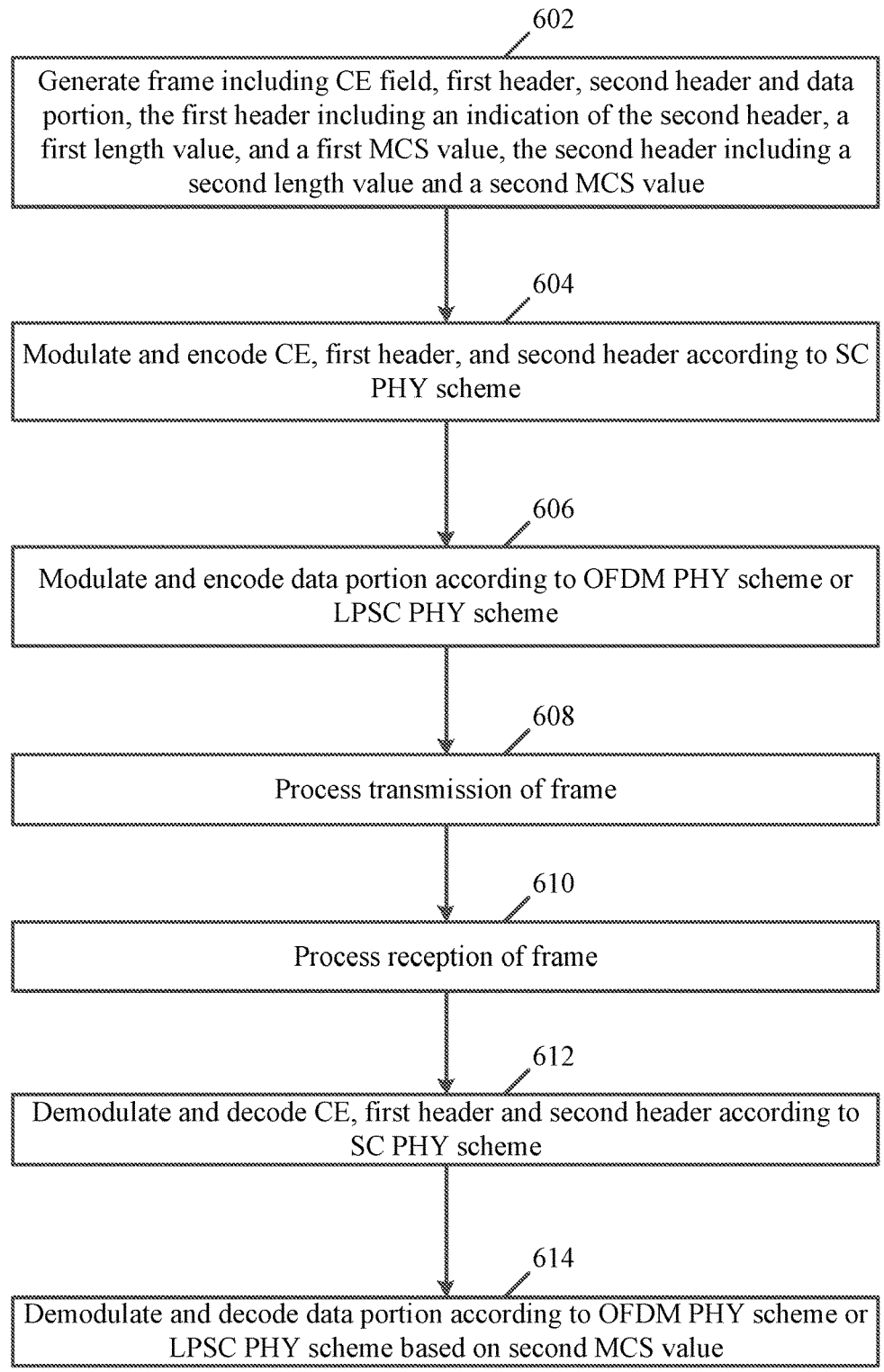
FIG. 6 is a schematic flow-chart illustration of a method of communicating a frame, in accordance with some demonstrative embodiments.

Reference is made to FIG. 6, which schematically illustrates a method of communicating a wireless transmission according to a PHY scheme, in accordance with some demonstrative embodiments. For example, one or more of the operations of the method of FIG. 6 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 602, the method may include generating a frame including a CE field, a first header, a second header, and a data portion, the first header including an indication of the second header, a first length value configured according to a length of the second header and the data portion, and a first MCS value, the second header including a second length value configured according to a length of the data portion, and a second MCS value. For example, controller 124 (FIG. 1) may cause message processor 128 (FIG. 1) to generate frame 400 (FIG. 4), e.g., as described above.

As indicated at block 604, the method may include modulating and encoding the CE field, the first header, and the second header according to a SC PHY scheme. For example, controller 124 (FIG. 1) may cause device 102 (FIG. 1) to modulate and encode the CE field 404 (FIG. 4), header 406 (FIG. 4), and header 426 (FIG. 4) according to the SC PHY scheme, e.g., as described above.

As indicated at block 606, the method may include modulating and encoding the data portion according to the OFDM PHY scheme or the LPSC PHY scheme. For example, controller 124 (FIG. 1) may cause device 102 (FIG. 1) to modulate and encode the data portion 408 (FIG. 4) according to the OFDM PHY scheme or the LPSC PHY scheme, for example, according to the second MCS value in MCS field 423 (FIG. 4), e.g., as described above.

As indicated at block 608, the method may include processing transmission of the frame. For example, For example, controller 124 (FIG. 1) may cause device 102 (FIG. 1) to process transmission of frame 400 (FIG. 4), e.g., as described above.

As indicated at block 610, the method may include processing reception of the frame. For example, controller 154 (FIG. 1) may cause message processor 158 (FIG. 1) to process reception of the frame 400 (FIG. 4), e.g., as described above.

As indicated at block 612, the method may include demodulating and decoding the CE field, the first header, and the second header according to a SC PHY scheme. For example, controller 154 (FIG. 1) may cause device 140 (FIG. 1) to demodulate and CE field 404 (FIG. 4), header 406 (FIG. 4), and header 426 (FIG. 4) according to a SC PHY scheme, e.g., as described above.

As indicated at block 614, the method may include demodulating and decoding the data portion of the frame according to the OFDM PHY scheme or the LPSC PHY scheme, e.g., based on the second MCS value in the second header of the frame. For example, controller 154 (FIG. 1) may cause device 140 (FIG. 1) to demodulate and decode the data portion 408 (FIG. 4) of the frame 400 (FIG. 4) according to an OFDM PHY scheme or the LPSC PHY scheme, for example, based on the MCS value in the MCS field 423 (FIG. 4), e.g., as described above.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of devices 102 and/or 140 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform one or more operations and/or functionalities, for example, one or more operations of the method of FIGS. 5 and/or 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a wireless station to generate a frame comprising a header and a data portion, the header comprising a modulation and coding scheme (MCS) value of an Orthogonal Frequency Divisional Multiplexing (OFDM) Physical layer (PHY) scheme or a Low Power Single Carrier (LPSC) PHY scheme; modulate and encode the header according to a Single Carrier (SC) PHY scheme; modulate and encode the data portion according to the OFDM PHY scheme or the LPSC PHY scheme; and process transmission of the frame.

Example 2 includes the subject matter of Example 1 being configured to cause the wireless station to set the MCS value to a value between 13 and 24, and to modulate and encode the data portion according to the OFDM PHY scheme.

Example 3 includes the subject matter of Example 2 being configured to cause the wireless station to process transmission of the header over a single carrier, and the data portion over a multi-carrier.

Example 4 includes the subject matter of Example 1 being configured to cause the wireless station to set the MCS value to a value between 25 and 31, and to modulate and encode the data portion according to the LPSC PHY scheme.

Example 5 includes the subject matter of any one of Examples 1-4, and optionally, wherein the frame comprises one or more dummy elements after the header and before the data portion, the one or more dummy elements comprising at least one element selected from the group consisting of one or more OFDM symbols, and one or more dummy LPSC blocks.

Example 6 includes the subject matter of any one of Examples 1-5, and optionally, wherein the wireless station is a Direct Multi-Gigabit (DMG) station.

Example 7 includes the subject matter of Example 6 being configured to cause the wireless station to process transmission of the frame over a DMG band.

Example 8 includes the subject matter of any one of Examples 1-7, and optionally, comprising one or more antennas, and a memory.

Example 9 includes an apparatus comprising circuitry configured to cause a wireless station to process reception of a frame comprising a header and a data portion, the header comprising a modulation and coding scheme (MCS) value of an Orthogonal Frequency Divisional Multiplexing (OFDM) Physical layer (PHY) scheme or a Low Power Single Carrier (LPSC) PHY scheme; demodulate and decode the header according to a Single Carrier (SC) PHY scheme; and based on the MCS value, demodulate and decode the data portion according to the OFDM PHY scheme or the LPSC PHY scheme.

Example 10 includes the subject matter of Example 9 being configured to cause the wireless station to demodulate and decode the data portion according to the OFDM PHY scheme, when the MCS value is between 13 and 24.

Example 11 includes the subject matter of Example 10 being configured to cause the wireless station to process reception of the header over a single carrier, and the data portion over a multi-carrier.

Example 12 includes the subject matter of Example 9 being configured to cause the wireless station to demodulate and decode the data portion according to the LPSC PHY scheme, when the MCS value is between 25 and 31.

Example 13 includes the subject matter of any one of Examples 9-12, and optionally, wherein the frame comprises one or more dummy elements after the header and before the data portion, the one or more dummy elements comprising at least one element selected from the group consisting of one or more OFDM symbols, and one or more dummy LPSC blocks.

Example 14 includes the subject matter of any one of Examples 9-13, and optionally, wherein the wireless station is a Direct Multi-Gigabit (DMG) station.

Example 15 includes the subject matter of Example 14 being configured to cause the wireless station to process reception of the frame over a DMG band.

Example 16 includes the subject matter of any one of Examples 9-15, and optionally, comprising one or more antennas, and a memory.

Example 17 includes an apparatus comprising circuitry configured to cause a wireless station to generate a frame comprising a channel estimation (CE) field, a first header, a second header, and a data portion, the first header comprising an indication of the second header, a first length value configured according to a length of the second header and the data portion, and a first modulation and coding scheme (MCS) value, the second header comprising a second length value configured according to a length of the data portion, and a second MCS value; modulate and encode the CE field, the first header and the second header according to a Single Carrier (SC) Physical layer (PHY) scheme; modulate and encode the data portion according to an Orthogonal Frequency Divisional Multiplexing (OFDM) PHY scheme or a Low Power SC (LPSC) PHY scheme; and process transmission of the frame.

Example 18 includes the subject matter of Example 17, and optionally, wherein the first header comprises a reserved bit set to a predefined value to indicate presence of the second header.

Example 19 includes the subject matter of Example 17 or 18, and optionally, wherein the first length value comprises a number of SC blocks corresponding to the length of the second header and the data portion.

Example 20 includes the subject matter of any one of Examples 17-19, and optionally, wherein the first MCS value is between 1 and 12, and the second MCS value is greater than 12.

Example 21 includes the subject matter of Example 20 being configured to cause the wireless station to set the second MCS value to a value between 13 and 24, and to modulate and encode the data portion according to the OFDM PHY scheme.

Example 22 includes the subject matter of Example 21 being configured to cause the wireless station to process transmission of the first and second headers over a single carrier, and the data portion over a multi-carrier.

Example 23 includes the subject matter of Example 20 being configured to cause the wireless station to set the second MCS value to a value between 25 and 31, and to modulate and encode the data portion according to the LPSC PHY scheme.

Example 24 includes the subject matter of any one of Examples 17-23, and optionally, wherein the wireless station is a Direct Multi-Gigabit (DMG) station.

Example 25 includes the subject matter of Example 24 being configured to cause the wireless station to process transmission of the frame over a DMG band.

Example 26 includes the subject matter of any one of Examples 17-25, and optionally, comprising one or more antennas, and a memory.

Example 27 includes an apparatus comprising circuitry configured to cause a wireless station to process reception of a frame comprising a channel estimation (CE) field, a first header, a second header, and a data portion, the first header comprising an indication of the second header, a first length value configured according to a length of the second header and the data portion, and a first modulation and coding scheme (MCS) value, the second header comprising a second length value configured according to a length of the data portion, and a second MCS value; demodulate and decode the CE field, the first header and the second header according to a Single Carrier (SC) Physical layer (PHY) scheme; and based on the second MCS value, demodulate and decode the data portion according to an Orthogonal Frequency Divisional Multiplexing (OFDM) PHY scheme or a Low Power SC (LPSC) PHY scheme.

Example 28 includes the subject matter of Example 27, and optionally, wherein the first header comprises a reserved bit set to a predefined value to indicate presence of the second header.

Example 29 includes the subject matter of Example 27 or 28, and optionally, wherein the first length value comprises a number of SC blocks corresponding to the length of the second header and the data portion.

Example 30 includes the subject matter of any one of Examples 27-29, and optionally, wherein the first MCS value is between 1 and 12, and the second MCS value is greater than 12.

Example 31 includes the subject matter of Example 30 being configured to cause the wireless station to demodulate and decode the data portion according to the OFDM PHY scheme, when the second MCS value is between 13 and 24.

Example 32 includes the subject matter of Example 31 being configured to cause the wireless station to process reception of the first and second headers over a single carrier, and the data portion over a multi-carrier.

Example 33 includes the subject matter of Example 30 being configured to cause the wireless station to demodulate and decode the data portion according to the LPSC PHY scheme, when the second MCS value is between 25 and 31.

Example 34 includes the subject matter of any one of Examples 27-33, and optionally, wherein the wireless station is a Direct Multi-Gigabit (DMG) station.

Example 35 includes the subject matter of Example 34 being configured to cause the wireless station to process reception of the frame over a DMG band.

Example 36 includes the subject matter of any one of Examples 27-35, and optionally, comprising one or more antennas, and a memory.

Example 37 includes a method to be performed at a wireless station, the method comprising generating a frame comprising a header and a data portion, the header comprising a modulation and coding scheme (MCS) value of an Orthogonal Frequency Divisional Multiplexing (OFDM) Physical layer (PHY) scheme or a Low Power Single Carrier (LPSC) PHY scheme; modulating and encoding the header according to a Single Carrier (SC) PHY scheme; modulating and encoding the data portion according to the OFDM PHY scheme or the LPSC PHY scheme; and processing transmission of the frame.

Example 38 includes the subject matter of Example 37, and optionally, comprising setting the MCS value to a value between 13 and 24, and modulating and encoding the data portion according to the OFDM PHY scheme.

Example 39 includes the subject matter of Example 38, and optionally, comprising processing transmission of the header over a single carrier, and the data portion over a multi-carrier.

Example 40 includes the subject matter of Example 37, and optionally, comprising setting the MCS value to a value between 25 and 31, and modulating and encoding the data portion according to the LPSC PHY scheme.

Example 41 includes the subject matter of any one of Examples 37-40, and optionally, wherein the frame comprises one or more dummy elements after the header and before the data portion, the one or more dummy elements comprising at least one element selected from the group consisting of one or more OFDM symbols, and one or more dummy LPSC blocks.

Example 42 includes the subject matter of any one of Examples 37-41, and optionally, wherein the wireless station is a Direct Multi-Gigabit (DMG) station.

Example 43 includes the subject matter of Example 42, and optionally, comprising processing transmission of the frame over a DMG band.

Example 44 includes a method to be performed at a wireless station, the method comprising processing reception of a frame comprising a header and a data portion, the header comprising a modulation and coding scheme (MCS) value of an Orthogonal Frequency Divisional Multiplexing (OFDM) Physical layer (PHY) scheme or a Low Power Single Carrier (LPSC) PHY scheme; demodulating and decoding the header according to a Single Carrier (SC) PHY scheme; and based on the MCS value, demodulating and decoding the data portion according to the OFDM PHY scheme or the LPSC PHY scheme.

Example 45 includes the subject matter of Example 44, and optionally, comprising demodulating and decoding the data portion according to the OFDM PHY scheme, when the MCS value is between 13 and 24.

Example 46 includes the subject matter of Example 45, and optionally, comprising processing reception of the header over a single carrier, and the data portion over a multi-carrier.

Example 47 includes the subject matter of Example 44, and optionally, comprising demodulating and decoding the data portion according to the LPSC PHY scheme, when the MCS value is between 25 and 31.

Example 48 includes the subject matter of any one of Examples 44-47, and optionally, wherein the frame comprises one or more dummy elements after the header and before the data portion, the one or more dummy elements comprising at least one element selected from the group consisting of one or more OFDM symbols, and one or more dummy LPSC blocks.

Example 49 includes the subject matter of any one of Examples 44-48, and optionally, wherein the wireless station is a Direct Multi-Gigabit (DMG) station.

Example 50 includes the subject matter of Example 49, and optionally, comprising processing reception of the frame over a DMG band.

Example 51 includes a method to be performed at a wireless station, the method comprising generating a frame comprising a channel estimation (CE) field, a first header, a second header, and a data portion, the first header comprising an indication of the second header, a first length value configured according to a length of the second header and the data portion, and a first modulation and coding scheme (MCS) value, the second header comprising a second length value configured according to a length of the data portion, and a second MCS value; modulating and encoding the CE field, the first header and the second header according to a Single Carrier (SC) Physical layer (PHY) scheme; modulating and encoding the data portion according to an Orthogonal Frequency Divisional Multiplexing (OFDM) PHY scheme or a Low Power SC (LPSC) PHY scheme; and processing transmission of the frame.

Example 52 includes the subject matter of Example 51, and optionally, wherein the first header comprises a reserved bit set to a predefined value to indicate presence of the second header.

Example 53 includes the subject matter of Example 51 or 52, and optionally, wherein the first length value comprises a number of SC blocks corresponding to the length of the second header and the data portion.

Example 54 includes the subject matter of any one of Examples 51-53, and optionally, wherein the first MCS value is between 1 and 12, and the second MCS value is greater than 12.

Example 55 includes the subject matter of Example 54, and optionally, comprising setting the second MCS value to a value between 13 and 24, and modulating and encoding the data portion according to the OFDM PHY scheme.

Example 56 includes the subject matter of Example 55, and optionally, comprising processing transmission of the first and second headers over a single carrier, and the data portion over a multi-carrier.

Example 57 includes the subject matter of Example 54, and optionally, comprising setting the second MCS value to a value between 25 and 31, and modulating and encoding the data portion according to the LPSC PHY scheme.

Example 58 includes the subject matter of any one of Examples 51-57, and optionally, wherein the wireless station is a Direct Multi-Gigabit (DMG) station.

Example 59 includes the subject matter of Example 58, and optionally, comprising processing transmission of the frame over a DMG band.

Example 60 includes a method to be performed at a wireless station, the method comprising processing reception of a frame comprising a channel estimation (CE) field, a first header, a second header, and a data portion, the first header comprising an indication of the second header, a first length value configured according to a length of the second header and the data portion, and a first modulation and coding scheme (MCS) value, the second header comprising a second length value configured according to a length of the data portion, and a second MCS value; demodulating and decoding the CE field, the first header and the second header according to a Single Carrier (SC) Physical layer (PHY) scheme; and based on the second MCS value, demodulating and decoding the data portion according to an Orthogonal Frequency Divisional Multiplexing (OFDM) PHY scheme or a Low Power SC (LPSC) PHY scheme.

Example 61 includes the subject matter of Example 60, and optionally, wherein the first header comprises a reserved bit set to a predefined value to indicate presence of the second header.

Example 62 includes the subject matter of Example 60 or 61, and optionally, wherein the first length value comprises a number of SC blocks corresponding to the length of the second header and the data portion.

Example 63 includes the subject matter of any one of Examples 60-62, and optionally, wherein the first MCS value is between 1 and 12, and the second MCS value is greater than 12.

Example 64 includes the subject matter of Example 63, and optionally, comprising demodulating and decoding the data portion according to the OFDM PHY scheme, when the second MCS value is between 13 and 24.

Example 65 includes the subject matter of Example 64, and optionally, comprising processing reception of the first and second headers over a single carrier, and the data portion over a multi-carrier.

Example 66 includes the subject matter of Example 63, and optionally, comprising demodulating and decoding the data portion according to the LPSC PHY scheme, when the second MCS value is between 25 and 31.

Example 67 includes the subject matter of any one of Examples 60-66, and optionally, wherein the wireless station is a Direct Multi-Gigabit (DMG) station.

Example 68 includes the subject matter of Example 67, and optionally, comprising processing reception of the frame over a DMG band.

Example 69 includes a product comprising one or more tangible computer-readable non-transitory storage media comprising computer-executable instructions operable to, when executed by at least one computer processor, enable the at least one computer processor to implement one or more operations, the operations comprising generating a frame comprising a header and a data portion, the header comprising a modulation and coding scheme (MCS) value of an Orthogonal Frequency Divisional Multiplexing (OFDM) Physical layer (PHY) scheme or a Low Power Single Carrier (LPSC) PHY scheme; modulating and encoding the header according to a Single Carrier (SC) PHY scheme; modulating and encoding the data portion according to the OFDM PHY scheme or the LPSC PHY scheme; and processing transmission of the frame.

Example 70 includes the subject matter of Example 69, and optionally, wherein the operations comprise setting the MCS value to a value between 13 and 24, and modulating and encoding the data portion according to the OFDM PHY scheme.

Example 71 includes the subject matter of Example 70, and optionally, wherein the operations comprise processing transmission of the header over a single carrier, and the data portion over a multi-carrier.

Example 72 includes the subject matter of Example 69, and optionally, wherein the operations comprise setting the MCS value to a value between 25 and 31, and modulating and encoding the data portion according to the LPSC PHY scheme.

Example 73 includes the subject matter of any one of Examples 69-72, and optionally, wherein the frame comprises one or more dummy elements after the header and before the data portion, the one or more dummy elements comprising at least one element selected from the group consisting of one or more OFDM symbols, and one or more dummy LPSC blocks.

Example 74 includes the subject matter of any one of Examples 69-73, and optionally, wherein the wireless station is a Direct Multi-Gigabit (DMG) station.

Example 75 includes the subject matter of Example 74, and optionally, wherein the operations comprise processing transmission of the frame over a DMG band.

Example 76 includes a product comprising one or more tangible computer-readable non-transitory storage media comprising computer-executable instructions operable to, when executed by at least one computer processor, enable the at least one computer processor to implement one or more operations, the operations comprising processing reception of a frame comprising a header and a data portion, the header comprising a modulation and coding scheme (MCS) value of an Orthogonal Frequency Divisional Multiplexing (OFDM) Physical layer (PHY) scheme or a Low Power Single Carrier (LPSC) PHY scheme; demodulating and decoding the header according to a Single Carrier (SC) PHY scheme; and based on the MCS value, demodulating and decoding the data portion according to the OFDM PHY scheme or the LPSC PHY scheme.

Example 77 includes the subject matter of Example 76, and optionally, wherein the operations comprise demodulating and decoding the data portion according to the OFDM PHY scheme, when the MCS value is between 13 and 24.

Example 78 includes the subject matter of Example 77, and optionally, wherein the operations comprise processing reception of the header over a single carrier, and the data portion over a multi-carrier.

Example 79 includes the subject matter of Example 76, and optionally, wherein the operations comprise demodulating and decoding the data portion according to the LPSC PHY scheme, when the MCS value is between 25 and 31.

Example 80 includes the subject matter of any one of Examples 76-79, and optionally, wherein the frame comprises one or more dummy elements after the header and before the data portion, the one or more dummy elements comprising at least one element selected from the group consisting of one or more OFDM symbols, and one or more dummy LPSC blocks.

Example 81 includes the subject matter of any one of Examples 76-80, and optionally, wherein the wireless station is a Direct Multi-Gigabit (DMG) station.

Example 82 includes the subject matter of Example 81, and optionally, wherein the operations comprise processing reception of the frame over a DMG band.

Example 83 includes a product comprising one or more tangible computer-readable non-transitory storage media comprising computer-executable instructions operable to, when executed by at least one computer processor, enable the at least one computer processor to implement one or more operations, the operations comprising generating a frame comprising a channel estimation (CE) field, a first header, a second header, and a data portion, the first header comprising an indication of the second header, a first length value configured according to a length of the second header and the data portion, and a first modulation and coding scheme (MCS) value, the second header comprising a second length value configured according to a length of the data portion, and a second MCS value; modulating and encoding the CE field, the first header and the second header according to a Single Carrier (SC) Physical layer (PHY) scheme; modulating and encoding the data portion according to an Orthogonal Frequency Divisional Multiplexing (OFDM) PHY scheme or a Low Power SC (LPSC) PHY scheme; and processing transmission of the frame.

Example 84 includes the subject matter of Example 83, and optionally, wherein the first header comprises a reserved bit set to a predefined value to indicate presence of the second header.

Example 85 includes the subject matter of Example 83 or 84, and optionally, wherein the first length value comprises a number of SC blocks corresponding to the length of the second header and the data portion.

Example 86 includes the subject matter of any one of Examples 83-85, and optionally, wherein the first MCS value is between 1 and 12, and the second MCS value is greater than 12.

Example 87 includes the subject matter of Example 86, and optionally, wherein the operations comprise setting the second MCS value to a value between 13 and 24, and modulating and encoding the data portion according to the OFDM PHY scheme.

Example 88 includes the subject matter of Example 87, and optionally, wherein the operations comprise processing transmission of the first and second headers over a single carrier, and the data portion over a multi-carrier.

Example 89 includes the subject matter of Example 86, and optionally, wherein the operations comprise setting the second MCS value to a value between 25 and 31, and modulating and encoding the data portion according to the LPSC PHY scheme.

Example 90 includes the subject matter of any one of Examples 83-89, and optionally, wherein the wireless station is a Direct Multi-Gigabit (DMG) station.

Example 91 includes the subject matter of Example 90, and optionally, wherein the operations comprise processing transmission of the frame over a DMG band.

Example 92 includes a product comprising one or more tangible computer-readable non-transitory storage media comprising computer-executable instructions operable to, when executed by at least one computer processor, enable the at least one computer processor to implement one or more operations, the operations comprising processing reception of a frame comprising a channel estimation (CE) field, a first header, a second header, and a data portion, the first header comprising an indication of the second header, a first length value configured according to a length of the second header and the data portion, and a first modulation and coding scheme (MCS) value, the second header comprising a second length value configured according to a length of the data portion, and a second MCS value; demodulating and decoding the CE field, the first header and the second header according to a Single Carrier (SC) Physical layer (PHY) scheme; and based on the second MCS value, demodulating and decoding the data portion according to an Orthogonal Frequency Divisional Multiplexing (OFDM) PHY scheme or a Low Power SC (LPSC) PHY scheme.

Example 93 includes the subject matter of Example 92, and optionally, wherein the first header comprises a reserved bit set to a predefined value to indicate presence of the second header.

Example 94 includes the subject matter of Example 92 or 93, and optionally, wherein the first length value comprises a number of SC blocks corresponding to the length of the second header and the data portion.

Example 95 includes the subject matter of any one of Examples 92-94, and optionally, wherein the first MCS value is between 1 and 12, and the second MCS value is greater than 12.

Example 96 includes the subject matter of Example 95, and optionally, wherein the operations comprise demodulating and decoding the data portion according to the OFDM PHY scheme, when the second MCS value is between 13 and 24.

Example 97 includes the subject matter of Example 96, and optionally, wherein the operations comprise processing reception of the first and second headers over a single carrier, and the data portion over a multi-carrier.

Example 98 includes the subject matter of Example 95, and optionally, wherein the operations comprise demodulating and decoding the data portion according to the LPSC PHY scheme, when the second MCS value is between 25 and 31.

Example 99 includes the subject matter of any one of Examples 92-98, and optionally, wherein the wireless station is a Direct Multi-Gigabit (DMG) station.

Example 100 includes the subject matter of Example 99, and optionally, wherein the operations comprise processing reception of the frame over a DMG band.

Example 101 includes an apparatus of wireless communication by a wireless station, the apparatus comprising means for generating a frame comprising a header and a data portion, the header comprising a modulation and coding scheme (MCS) value of an Orthogonal Frequency Divisional Multiplexing (OFDM) Physical layer (PHY) scheme or a Low Power Single Carrier (LPSC) PHY scheme; means for modulating and encoding the header according to a Single Carrier (SC) PHY scheme; means for modulating and encoding the data portion according to the OFDM PHY scheme or the LPSC PHY scheme; and means for processing transmission of the frame.

Example 102 includes the subject matter of Example 101, and optionally, comprising means for setting the MCS value to a value between 13 and 24, and modulating and encoding the data portion according to the OFDM PHY scheme.

Example 103 includes the subject matter of Example 102, and optionally, comprising means for processing transmission of the header over a single carrier, and the data portion over a multi-carrier.

Example 104 includes the subject matter of Example 101, and optionally, comprising means for setting the MCS value to a value between 25 and 31, and modulating and encoding the data portion according to the LPSC PHY scheme.

Example 105 includes the subject matter of any one of Examples 101-104, and optionally, wherein the frame comprises one or more dummy elements after the header and before the data portion, the one or more dummy elements comprising at least one element selected from the group consisting of one or more OFDM symbols, and one or more dummy LPSC blocks.

Example 106 includes the subject matter of any one of Examples 101-105, and optionally, wherein the wireless station is a Direct Multi-Gigabit (DMG) station.

Example 107 includes the subject matter of Example 106, and optionally, comprising means for processing transmission of the frame over a DMG band.

Example 108 includes an apparatus of wireless communication by a wireless station, the apparatus comprising means for processing reception of a frame comprising a header and a data portion, the header comprising a modulation and coding scheme (MCS) value of an Orthogonal Frequency Divisional Multiplexing (OFDM) Physical layer (PHY) scheme or a Low Power Single Carrier (LPSC) PHY scheme; means for demodulating and decoding the header according to a Single Carrier (SC) PHY scheme; and means for, based on the MCS value, demodulating and decoding the data portion according to the OFDM PHY scheme or the LPSC PHY scheme.

Example 109 includes the subject matter of Example 108, and optionally, comprising means for demodulating and decoding the data portion according to the OFDM PHY scheme, when the MCS value is between 13 and 24.

Example 110 includes the subject matter of Example 109, and optionally, comprising means for processing reception of the header over a single carrier, and the data portion over a multi-carrier.

Example 111 includes the subject matter of Example 108, and optionally, comprising means for demodulating and decoding the data portion according to the LPSC PHY scheme, when the MCS value is between 25 and 31.

Example 112 includes the subject matter of any one of Examples 108-111, and optionally, wherein the frame comprises one or more dummy elements after the header and before the data portion, the one or more dummy elements comprising at least one element selected from the group consisting of one or more OFDM symbols, and one or more dummy LPSC blocks.

Example 113 includes the subject matter of any one of Examples 108-112, and optionally, wherein the wireless station is a Direct Multi-Gigabit (DMG) station.

Example 114 includes the subject matter of Example 113, and optionally, comprising means for processing reception of the frame over a DMG band.

Example 115 includes an apparatus of wireless communication by a wireless station, the apparatus comprising means for generating a frame comprising a channel estimation (CE) field, a first header, a second header, and a data portion, the first header comprising an indication of the second header, a first length value configured according to a length of the second header and the data portion, and a first modulation and coding scheme (MCS) value, the second header comprising a second length value configured according to a length of the data portion, and a second MCS value; means for modulating and encoding the CE field, the first header and the second header according to a Single Carrier (SC) Physical layer (PHY) scheme; means for modulating and encoding the data portion according to an Orthogonal Frequency Divisional Multiplexing (OFDM) PHY scheme or a Low Power SC (LPSC) PHY scheme; and means for processing transmission of the frame.

Example 116 includes the subject matter of Example 115, and optionally, wherein the first header comprises a reserved bit set to a predefined value to indicate presence of the second header.

Example 117 includes the subject matter of Example 115 or 116, and optionally, wherein the first length value comprises a number of SC blocks corresponding to the length of the second header and the data portion.

Example 118 includes the subject matter of any one of Examples 115-117, and optionally, wherein the first MCS value is between 1 and 12, and the second MCS value is greater than 12.

Example 119 includes the subject matter of Example 118, and optionally, comprising means for setting the second MCS value to a value between 13 and 24, and modulating and encoding the data portion according to the OFDM PHY scheme.

Example 120 includes the subject matter of Example 119, and optionally, comprising means for processing transmission of the first and second headers over a single carrier, and the data portion over a multi-carrier.

Example 121 includes the subject matter of Example 118, and optionally, comprising means for setting the second MCS value to a value between 25 and 31, and modulating and encoding the data portion according to the LPSC PHY scheme.

Example 122 includes the subject matter of any one of Examples 115-121, and optionally, wherein the wireless station is a Direct Multi-Gigabit (DMG) station.

Example 123 includes the subject matter of Example 122, and optionally, comprising means for processing transmission of the frame over a DMG band.

Example 124 includes an apparatus of wireless communication by a wireless station, the apparatus comprising means for processing reception of a frame comprising a channel estimation (CE) field, a first header, a second header, and a data portion, the first header comprising an indication of the second header, a first length value configured according to a length of the second header and the data portion, and a first modulation and coding scheme (MCS) value, the second header comprising a second length value configured according to a length of the data portion, and a second MCS value; means for demodulating and decoding the CE field, the first header and the second header according to a Single Carrier (SC) Physical layer (PHY) scheme; and means for, based on the second MCS value, demodulating and decoding the data portion according to an Orthogonal Frequency Divisional Multiplexing (OFDM) PHY scheme or a Low Power SC (LPSC) PHY scheme.

Example 125 includes the subject matter of Example 124, and optionally, wherein the first header comprises a reserved bit set to a predefined value to indicate presence of the second header.

Example 126 includes the subject matter of Example 124 or 125, and optionally, wherein the first length value comprises a number of SC blocks corresponding to the length of the second header and the data portion.

Example 127 includes the subject matter of any one of Examples 124-126, and optionally, wherein the first MCS value is between 1 and 12, and the second MCS value is greater than 12.

Example 128 includes the subject matter of Example 127, and optionally, comprising means for demodulating and decoding the data portion according to the OFDM PHY scheme, when the second MCS value is between 13 and 24.

Example 129 includes the subject matter of Example 128, and optionally, comprising means for processing reception of the first and second headers over a single carrier, and the data portion over a multi-carrier.

Example 130 includes the subject matter of Example 127, and optionally, comprising means for demodulating and decoding the data portion according to the LPSC PHY scheme, when the second MCS value is between 25 and 31.

Example 131 includes the subject matter of any one of Examples 124-130, and optionally, wherein the wireless station is a Direct Multi-Gigabit (DMG) station.

Example 132 includes the subject matter of Example 131, and optionally, comprising means for processing reception of the frame over a DMG band.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication station to:
   modulate a plurality of fields of a frame according to a Single Carrier (SC) scheme, the plurality of fields comprising a Short Training Field (STF), a Channel Estimation Field (CEF), a first header, and a second header, the first header comprising a first indication to indicate a presence of the second header, the first header comprising a second indication to indicate whether a data portion of the frame is to be modulated according to the SC scheme or according to an Orthogonal Frequency Division Multiplexing (OFDM) scheme;
   modulate the data portion of the frame according to the SC scheme or the OFDM scheme, in accordance with the second indication in the first header; and
   transmit the frame in a frequency band above 45 Gigahertz (GHz).

2. The apparatus of claim 1, wherein the first indication comprises a reserved bit in the first header.

3. The apparatus of claim 1, wherein the second header comprises a Modulation and Coding Scheme (MCS) field to indicate an MCS to be applied to the data portion.

4. The apparatus of claim 1, wherein the first header comprises a first Modulation and Coding Scheme (MCS) field, and the second header comprises a second MCS field.

5. The apparatus of claim 1, wherein the second header comprises a length field based on a length of the data portion.

6. The apparatus of claim 1, wherein the first header comprises a first length field, and the second header comprises a second length field.

7. The apparatus of claim 1, wherein the first header comprises a length field to indicate a spoofed length of the frame.

8. The apparatus of claim 1 configured to cause the wireless communication station to set the second indication to a predefined value to indicate the OFDM scheme and to modulate the data portion of the frame according to the OFDM scheme.

9. The apparatus of claim 1 configured to cause the wireless communication station to set the second indication to a predefined value to indicate the SC scheme and to modulate the data portion of the frame according to the SC scheme.

10. The apparatus of claim 1, wherein the frame comprises a Training (TRN) field following the data portion.

11. The apparatus of claim 1 comprising a Medium Access Control (MAC), and a Physical Layer (PHY).

12. The apparatus of claim 1 comprising a radio.

13. The apparatus of claim 1 comprising one or more antennas, a memory, and a processor.

14. The apparatus of claim 2, wherein the reserved bit has a value of "1" to indicate the presence of the second header.

15. The apparatus of claim 4, wherein the first MCS field comprises an MCS value in the range 1-12.

16. The apparatus of claim 7, wherein the length field is based on a number of SC blocks.

17. A product comprising one or more tangible computer-readable non-transitory storage media comprising computer-executable instructions operable to, when executed by at least one processor, enable the at least one processor to cause a wireless communication station to:
   modulate a plurality of fields of a frame according to a Single Carrier (SC) scheme, the plurality of fields comprising a Short Training Field (STF), a Channel Estimation Field (CEF), a first header, and a second header, the first header comprising a first indication to indicate a presence of the second header, the first header comprising a second indication to indicate whether a data portion of the frame is to be modulated according to the SC scheme or according to an Orthogonal Frequency Division Multiplexing (OFDM) scheme;
   modulate the data portion of the frame according to the SC scheme or the OFDM scheme, in accordance with the second indication in the first header; and
   transmit the frame in a frequency band above 45 Gigahertz (GHz).

18. The product of claim 17, wherein the first indication comprises a reserved bit in the first header.

19. The product of claim 17, wherein the second header comprises a Modulation and Coding Scheme (MCS) field to indicate an MCS to be applied to the data portion.

20. The product of claim 17, wherein the first header comprises a first Modulation and Coding Scheme (MCS) field, and the second header comprises a second MCS field.

21. The product of claim 17, wherein the second header comprises a length field based on a length of the data portion.

22. The product of claim 17, wherein the first header comprises a first length field, and the second header comprises a second length field.

23. The product of claim 17, wherein the first header comprises a length field to indicate a spoofed length of the frame.

24. The product of claim 17, wherein the frame comprises a Training (TRN) field following the data portion.

25. The product of claim 23, wherein the length field is based on a number of SC blocks.

* * * * *